Jan. 28, 1964
G. RAUGLAS
3,119,470
TWO-WAY AUTOMATIC SLACK ADJUSTER
Filed Oct. 10, 1961
7 Sheets-Sheet 1
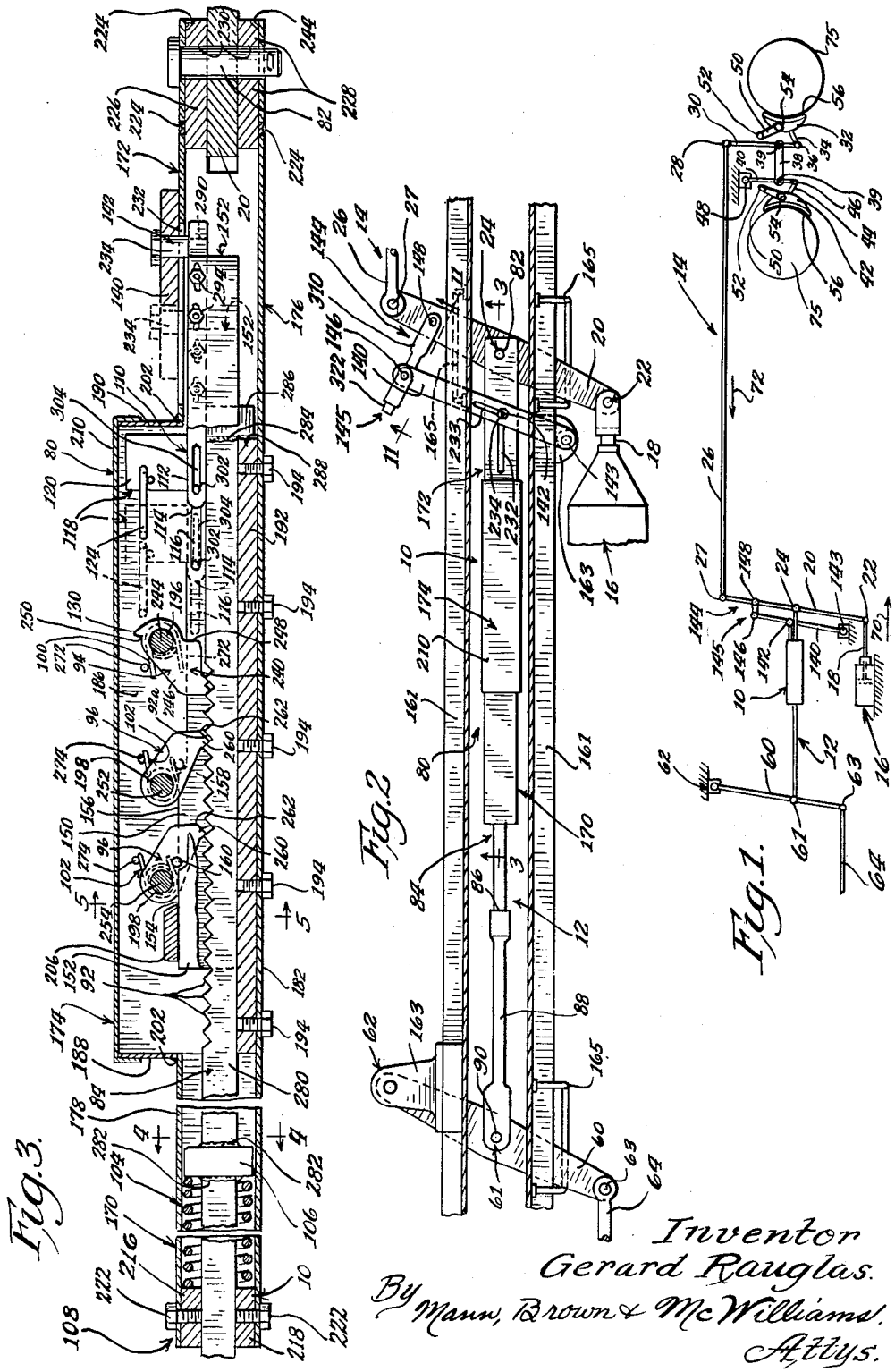
Inventor
Gerard Rauglas.
By Mann, Brown & McWilliams.
Attys.

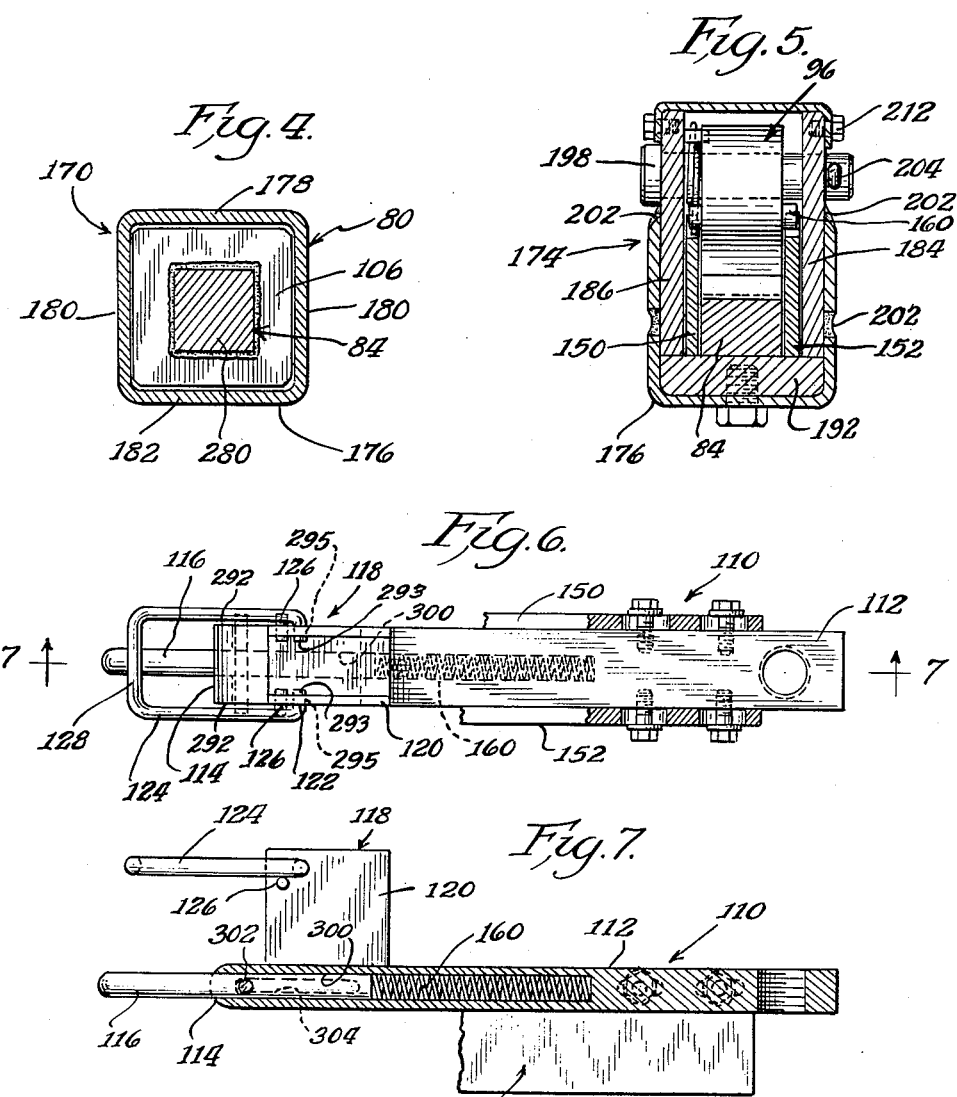

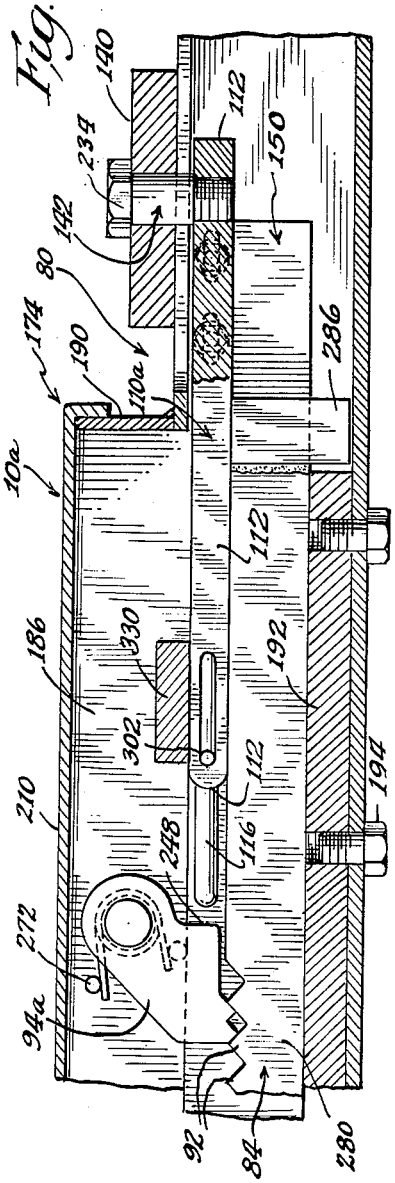

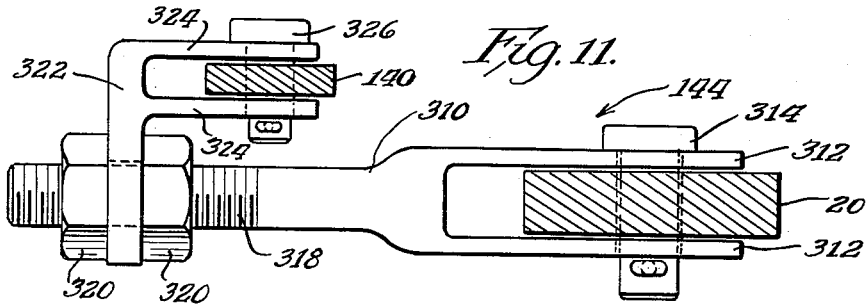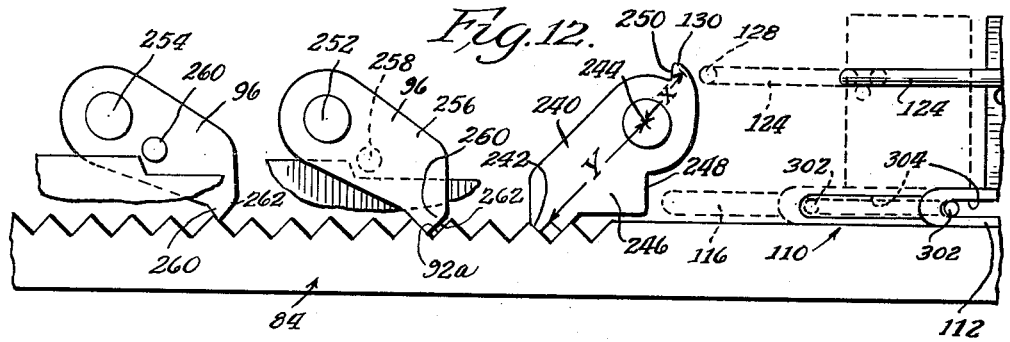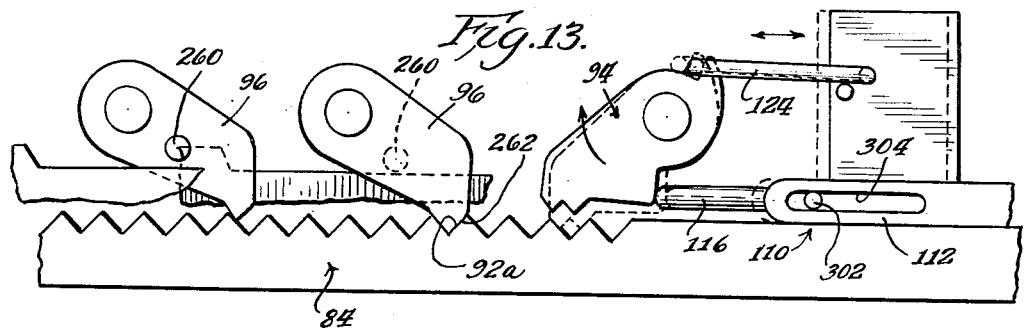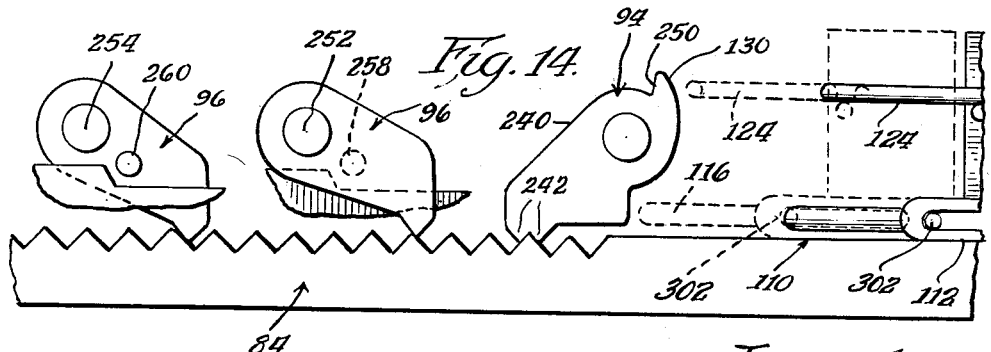

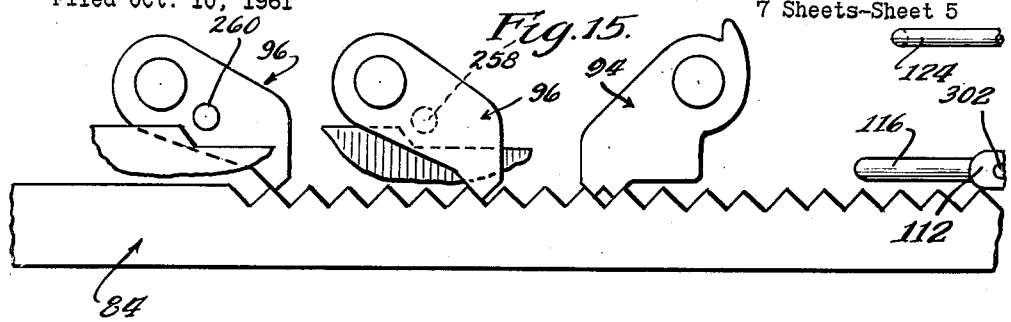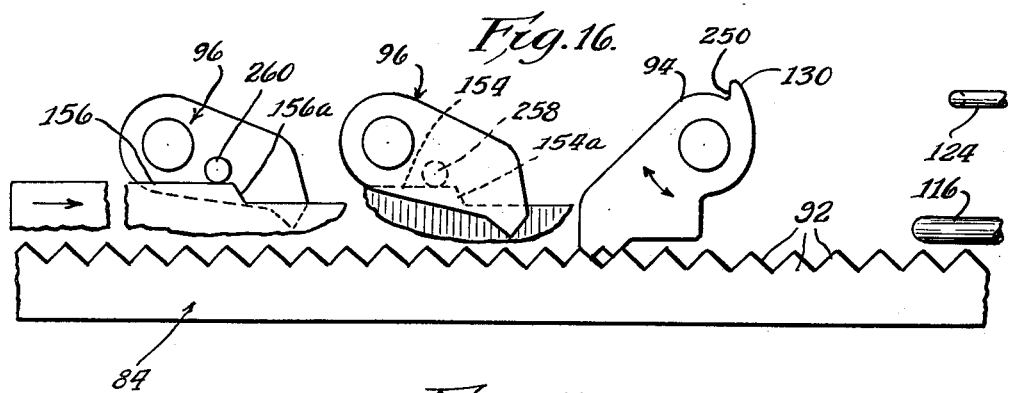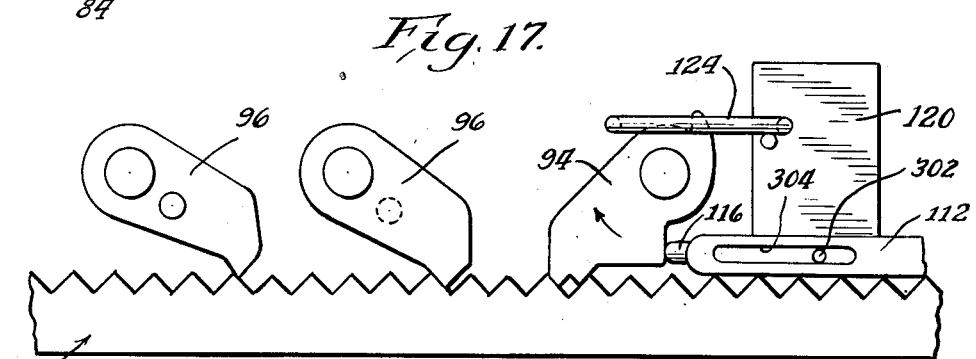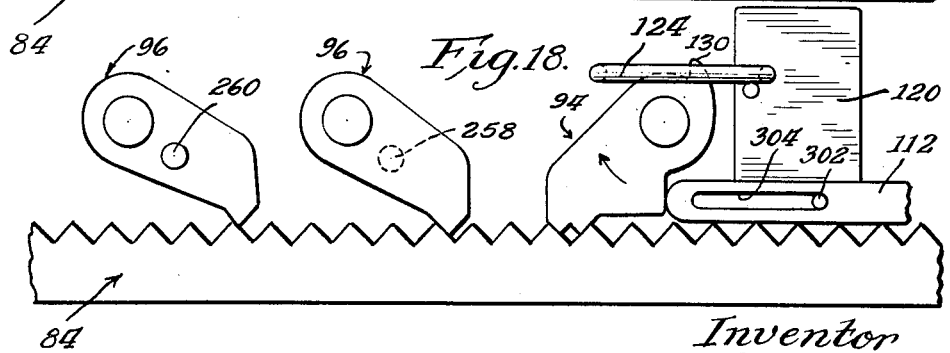

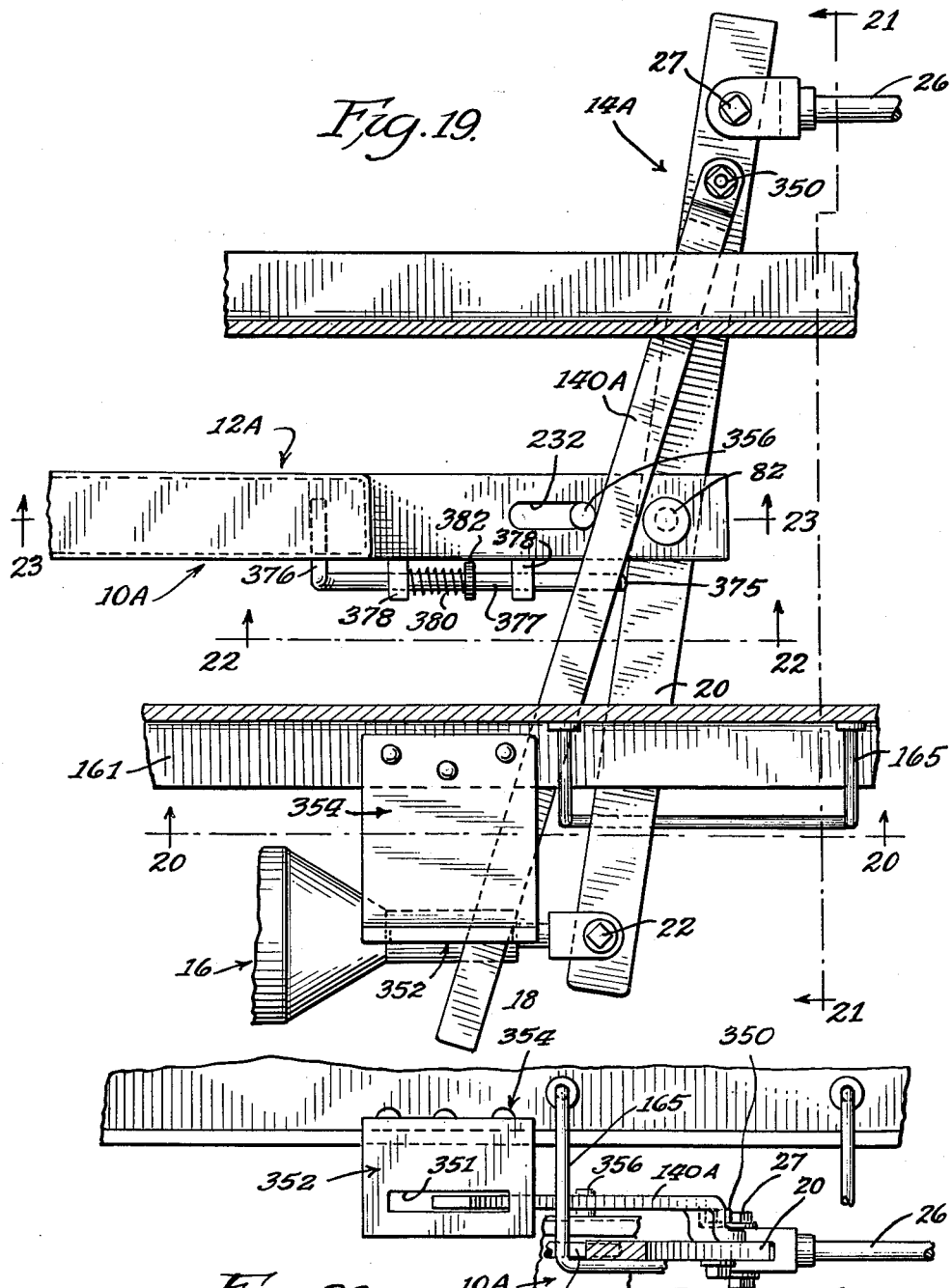

Jan. 28, 1964
G. RAUGLAS
3,119,470
TWO-WAY AUTOMATIC SLACK ADJUSTER
Filed Oct. 10, 1961
7 Sheets-Sheet 7
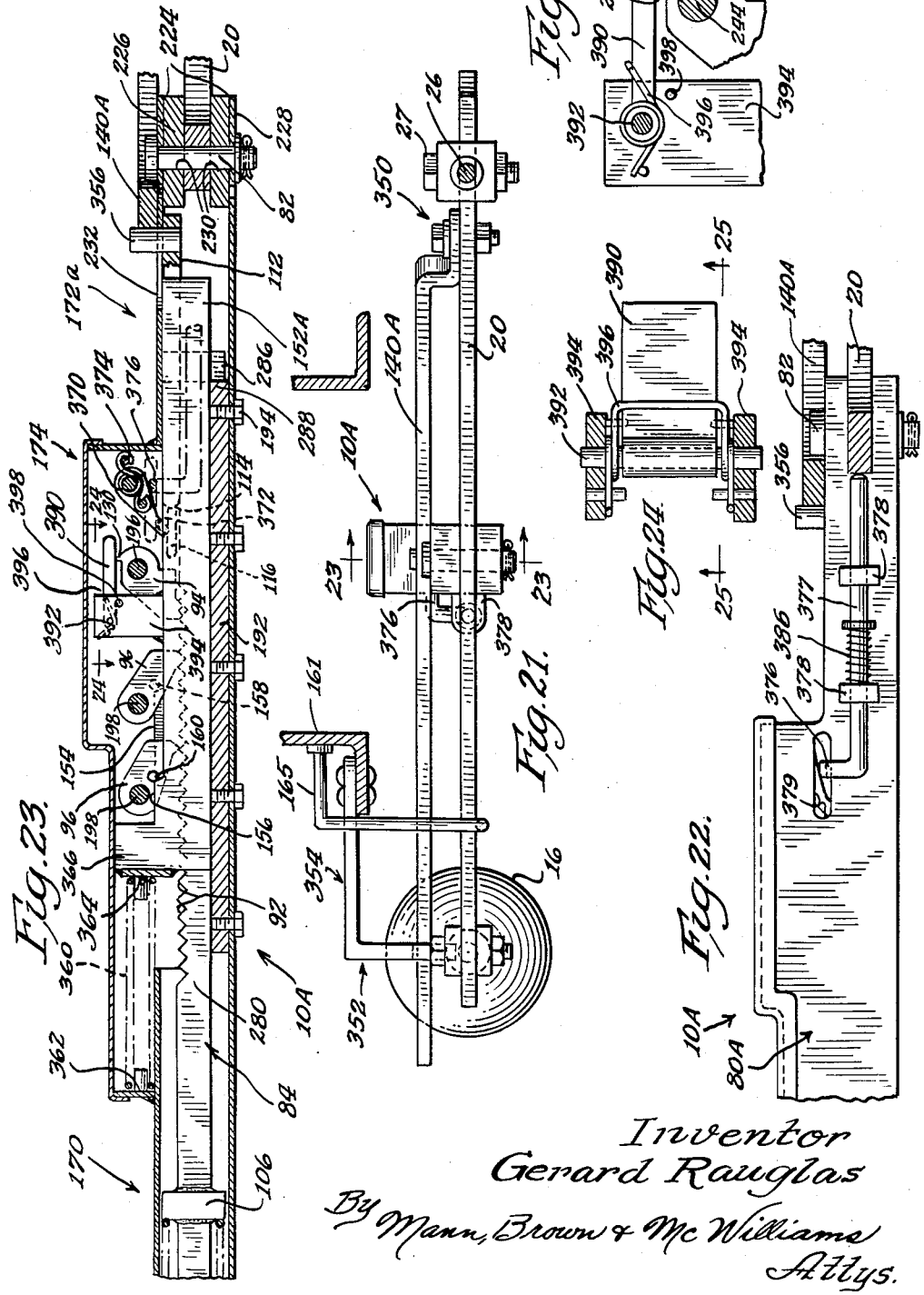
Inventor
Gerard Rauglas
By Mann, Brown & McWilliams
Attys.

United States Patent Office 3,119,470
Patented Jan. 28, 1964

3,119,470
TWO-WAY AUTOMATIC SLACK ADJUSTER
Gerard Rauglas, Aroma Park, Ill., assignor to Cardwell Westinghouse Company, Chicago, Ill., a corporation of Illinois
Filed Oct. 10, 1961, Ser. No. 144,144
7 Claims. (Cl. 188—200)

My invention relates to a two-way automatic slack adjuster for application to railroad car brake rigging, and more particularly, to a brake rigging slack control device that automatically takes up rigging slack (caused by brake shoe wear and the like) during the normal functioning of the car brake system, and that automatically lets out adequate slack when the car brake shoes are to be replaced.

Railroad car brake rigging slack adjusters are conventionally used to automatically take up rigging slack caused by brake shoe wear to insure that the brake cylinder power stroke remains approximately the same length for each operation of the car brake system. However, conventional slack adjuster arrangements do not take into consideration that the rigging slack taken up must also be conveniently released when shoe replacement is required to permit the necessary movement of the brake beams.

Thus, when the customary routine inspection for brake shoe wear is made, as by inspectors known to the industry as "car knockers," and the amount of brake shoe remaining indicates that new brake shoes are required, conventional slack adjusters require that the individual effecting such replacement (who is usually the "car knocker") must crawl under the car to manually effect release of the slack adjuster so that the brake beams may be sufficiently separated from the truck wheels to permit the necessary shoe replacement manipulations. Release of the slack adjuster is necessary to provide adequate rigging slack "let out" for accommodating the necessary brake beam movement in connection with shoe replacement.

Heretofore, some attempts have been made to design slack adjusters that would automatically permit this necessary brake rigging slack let out movement when brake shoe replacement is required, but the complex arrangements resulting proved to be impractical for a number of important reasons. For instance, since the slack adjuster is applied in an exposed position underneath the car, it is subjected in day to day use to the worst possible operating conditions that involve heavy dirt accumulations and the worst aspects of adverse weather conditions, not to mention shocks imposed on the car structure by high speed coupler impacts and the like. Consequently, slack adjusters involving screw threading and the like contemplating dirt free operating conditions and close fitting tolerances are not adapted for practical railroad car use.

Nevertheless, railroads have come to call for fully automatic slack adjuster operation in equipment of this type (meaning that the slack adjuster must provide for both automatic slack take up and let out) and this points up the general need for a practical form of fully automatic slack adjuster arrangement which is arranged so that it is fully operative regardless of any particular type of operating condition.

A principal object of this invention is to provide a practical two-way automatic slack adjuster that functions truly automatically in providing for both rigging slack take up and let out.

Another principal object of the invention is to provide a fully automatic slack adjuster, the efficient functioning of which is substantially independent of the conditions under which it is to operate.

A further important object of the invention is to provide a slack adjuster arrangement that employs operating parts of a simplified and reliable nature which are of a type that are not readily affected by dirt accumulations and adverse weather conditions.

Still further objects of the invention are to provide a slack adjuster that employs a polyphase slack take up arrangement to not only compensate for slack caused by normal brake shoe wear, but also compensate for the loss of one or more brake shoes, to provide a slack adjuster control arrangement that accurately senses both progressive slack increases (due to normal brake shoe wear) and brake shoe losses and effects appropriate slack adjustment therefor, to provide a slack adjuster that is specifically applicable for center rod applications but which may readily be adapted for other brake rigging applications, and to provide a slack adjuster that is economical of manufacture, reliable in operation, and convenient to install in either existing or new brake rigging arrangements.

Other objects, uses and advantages will be obvious or become apparent from a consideration of the following detailed description and the application drawings.

In the drawings:

FIGURE 1 is a diagrammatic view illustrating a typical brake rigging arrangement to which the slack adjuster of this application is directly applicable;

FIGURE 2 is a plan view illustrating the center rod structure and adjacent components of the brake rigging shown in FIGURE 1, showing one embodiment of my invention applied thereto;

FIGURE 3 is a diagrammatic longitudinal sectional view substantially along line 3—3 of FIGURE 2, illustrating the general arrangement of the slack adjuster of this invention;

FIGURE 4 is a diagrammatic cross-sectional view substantially along line 4—4 of FIGURE 3;

FIGURE 5 is a diagrammatic sectional view substantially along line 5—5 of FIGURE 3;

FIGURE 6 is a plan view of the reciprocating holding pawl release device that forms an important part of this invention, parts being broken away;

FIGURE 7 is a cross-sectional view substantially along line 7—7 of FIGURE 6, with parts being shown in elevation and other parts broken away;

FIGURE 8 is a diagrammatic perspective view of the slack adjuster structure shown in FIGURE 3, parts being broken away to expose other parts for better understanding of the invention;

FIGURE 9 is a perspective view of the pawl release device shown in FIGURES 6 and 7;

FIGURE 10 is an enlarged fragmental sectional view illustrating a modification of the invention, wherein the full line showing of the holding pawl release device shows same at the end of the standard seven inch brake cylinder stroke;

FIGURE 11 is a fragmental cross-sectional view substantially along the line 11—11 of FIGURE 2 illustrating an arrangement for adjusting the rigging slack to which my slack adjuster structure has been applied to provide a brake cylinder stroke length of any specific dimension, such as the standard seven inch stroke;

FIGURE 12 is a diagrammatic view illustrating the operative relation of the holding and working pawls, the rack member, and the holding pawl release device of this invention when the slack adjuster has been applied to a car equipped with new brake shoes to provide a seven inch brake cylinder stroke, with the release device being shown in the full line position to illustrate its relation at the beginning of the brake cylinder stroke, and in the dashed line position to illustrate its relative positioning at the end of the brake cylinder stroke prior to any material brake shoe wear;

FIGURE 13 is similar to FIGURE 12, but illustrates the positioning that the slack adjuster working pawls assume during the power stroke of the brake cylinder and the sequence of positions that the holding pawl release device assumes, at the end of the power stroke, when brake shoe wear has proceeded to the point that some adjustment of the brake rigging slack must be made, indicating also the resulting affect on the holding pawl;

FIGURE 14 is similar to that of FIGURES 12 and 13 but illustrates the next consecutive position of the working pawls and holding pawl after the operation of the holding pawl release device has effected the movement of the holding pawl that will permit an increment of slack take up by the slack adjuster;

FIGURE 15 is similar to that of FIGURES 12–14, but illustrates the relative positions of the holding pawl release device, the holding and working pawls, and the slack adjuster rack member approximately at the position of maximum slack take up provided for by the particular slack adjuster illustrated;

FIGURE 16 is similar to that of FIGURES 12–15, but illustrates the functioning of the holding pawl release device, the holding and working pawls, and the rack member when the brake rigging is tensioned to replace brake shoes, whereby brake rigging slack let out is automatically permitted;

FIGURE 17 is a view generally similar to that of FIGURES 12–16, but illustrates the operative relation of the holding pawl device, the holding and working pawls, and the rack member in the event of loss of one or two brake shoes, whereby actuation of the slack adjuster holding pawl is effected for automatic slack take up;

FIGURE 18 is a view that is generally similar to that of FIGURE 17, but illustrates the condition of these elements when more than two brake shoes have been lost, whereby the necessary amount of brake rigging slack take up is automatically effected;

FIGURE 19 is a view similar to that of FIGURE 2, but on an enlarged scale and illustrating a further modification of the invention;

FIGURE 20 is an elevational view substantially along line 20—20 of FIGURE 19, but omitting the brake cylinder and showing the trigger release lever at its pivot bracket in elevation;

FIGURES 21, 22 and 23 are cross-sectional views substantially along the corresponding section lines of FIGURE 19;

FIGURE 24 is a fragmental cross-sectional view along line 24—24 of FIGURE 23, and FIGURE 25 is a fragmental cross-sectional view along line 25—25 of FIGURE 24.

While the drawing figures illustrate preferred embodiments of the invention, it is to be understood that the drawing illustrations are provided for complying with the requirements of 35 U.S.C. 112, and that the invention is susceptible of a number of embodiments which will be obvious to those skilled in the art after having had the benefit of this disclosure.

*General Description*

Referring now to FIGURE 1, reference numeral 10 generally indicates one embodiment of this invention incorporated in the center rod structure 12 of a conventional brake rigging arrangement generally indicated by reference numeral 14. Other embodiments are shown in FIGURES 10 and 19–25.

As is well known in the art, the brake rigging 14 customarily includes air actuated brake cylinder 16 that is carried by the car in any suitable manner and includes a thrust or piston rod 18 that is pivotally connected to a cylinder or live lever 20, as at 22, which is in turn pivotally connected to the center rod structure 12 as at 24 and a connecting rod 26 (as at 27) that extends to one of the car trucks where it may be pivotally connected as at 28 to an actuating truck lever 30 that operates one of the brake beams 32 through a link 34 that is pivotally connected to lever 30 as at 36. The truck lever 30 is connected to truck dead lever 40 by link 38 and pivotal joints 39, which lever 40 is connected to the other truck brake beam 42 by link 44 (the link 44 being pivotally connected to the lever 40 by pivotal joint 46) and with the lever 40 being pivotally anchored to the car truck structure as at 48.

The brake beams 32 and 42 customarily are suspended from the truck by conventional hanger members 50 which are pivoted to the truck as at 52 and to the brake beam as at 54, respectively, and, of course, the brake beams each carry the diagrammatically illustrated brake shoes 56.

The center rod structure 12 is also pivotally connected, as at 61, to a dead lever 60 which is fulcrumed to the car structure as at 62 and is pivotally connected as at 63 to connecting rod 64 which is in turn operatively associated with the truck brake apparatus of the other car truck in a manner similar to that shown at the right hand side of FIGURE 1.

As is well known in the art, when a braking of the car is to be effected, the brake cylinder 16 is actuated to move thrust or piston rod 18 to the right of FIGURE 1, or in the direction of the arrow 70, which tends to throw the cylinder lever 20 counterclockwise about the pivotal connection 24 between it and the center rod structure 12; likewise, this motion tends to move the connecting rod 26 to the left of FIGURE 1 and in the direction of arrow 72 to swing the truck lever 30 in a manner to force brake shoes 56 against the diagrammatically illustrated truck wheels 75. The brakes are in effect released when the air is released from cylinder 16 due to the fact that the weight of brake beams 32 tends to swing them away from the respective wheels 75 about the pivotal mountings 52, which thus causes the connecting rod 26, the cylinder lever 20, and the thrust or piston rod 18 to move in the directions opposite to those indicated by the arrows 70 and 72.

Of course, the connection of the center rod structure 12 with lever 60 actuates the lever 60, connecting rod 64, and the truck braking apparatus it is connected to in a manner similar to that mentioned with regard to the truck brake apparatus shown in FIGURE 1.

A.A.R. regulations require that the power stroke of cylinder 16 be between seven and nine inches, although brake cylinders are customarily proportioned and applied to the car to accommodate a stroke as high as twelve inches to accommodate extreme situations. New cars when their brake rigging is applied and properly adjusted should provide a brake cylinder stroke of seven inches, assuming that the car trucks have new brake shoes applied thereto.

As is well known in the art, brake shoes tend to wear away during each application of the car brakes and while the brake shoe attrition is not materially noticeable for each braking operation, it is cumulative and causes an increasing amount of slack to be created in the rigging as day to day use of the car proceeds. The reason is that each time the car brakes are to be applied, the brake levers must be moved just a little further toward the wheels each time, which means that a slightly increased movement of the connecting rod 26 and the thrust or piston rod 18 is required for each time the brakes are applied. A.A.R. regulations require that when brake wear has proceeded to the point that the brake cylinder stroke has an "overtravel" of one inch (that is, exceeds the basic seven inch brake cylinder stroke by one inch), there must be sufficient take up in the brake rigging to restore the brake cylinder to approximately its original seven inch stroke.

This is the general function served by my slack adjuster 10, which in the present instance is incorporated in the center rod structure 12.

Referring now to FIGURES 2, 3 and 8, the slack adjuster 10 generally comprises a housing member 80 that is pivotally connected to the cylinder or live lever 20 by suitable pin 82 which forms the pivotal connection 24. Housing member 80 receives a rack member 84 that has one end thereof threaded as at 86 for connection with extension rod 88 that makes up the remainder of the center rod structure 12 and is pivotally connected to the dead lever 60 as by suitable pin 90 that forms pivotal connection 61.

As seen in FIGURES 3 and 8, the rack member 84 is formed with rack teeth 92 adapted to cooperate with a holding pawl 94 and working pawls 96 which are pivotally mounted for oppositely directed, unidirectional operative engagement with teeth 92.

As seen in FIGURE 3, the holding pawl 94 is biased into engagement with the rack teeth 92 by a suitable torsion spring 100 while the working pawls 96 are biased into engagement with the teeth by similar springs 102. The pawl 94 acts to prevent advancement of the rack member 84 into the housing member 80 under the action of slack take up compression spring 104, which acts between a rack member abutment structure 106 and a housing member abutment structure 108. The working pawls 96 are proportioned and located to alternately act to transfer the thrusts applied to the housing member 80 through the cylinder lever 20 (on operation of the brake cylinder 16) to the rack member 84. Thus, as thrust forces acting toward the right of FIGURE 3 are applied to the housing member 80, one of the working pawls 96 is brought into engagement with the adjacent face 92a of one of the rack teeth 92 to apply such forces to the rack member 84, and thus to dead lever 60 and the subsequent brake rigging elements. Pawls 94 and 96, respectively, ratchet freely over rack teeth 92 when the relative movements involved are opposite to the respective directions indicated immediately above.

In accordance with this invention, the pawls 94 and 96 are located and proportioned with respect to each other and with respect to the rack member 84 such that there will be a lost motion on the order of one-eighth of an inch between the housing member 80 and the rack member 84 before the thrust forces acting through the slack adjuster are applied to the rack member 84, with the result that the holding pawl 94 will be loosened from binding engagement with the rack teeth 92 as the brake cylinder thrusts are applied through the slack adjuster over the power stroke of the brake rigging. The spring 104 acts to restore the lost motion positioning relation of pawls 94 and 96 after the brake power stroke is completed.

Associated with the housing member 80 and the holding pawl 94 is a holding pawl release device, generally indicated at 110 in FIGURES 3, 8 and 9, for the purpose of releasing pawl 94 from locking engagement with rack teeth 92 to permit slack take up under the action of spring 104. The device 110, which may also be termed a trigger or catch release device, generally comprises a reciprocably mounted actuating or trigger bar or member 112 that in the embodiments illustrated rides on top of the rack member 84 and extends generally parallel to the housing and rack members. The trigger member 112 is provided with a rounded holding pawl contacting surface 114, outwardly of which projects a spring biased finger or projection 116 that is likewise directed toward holding pawl 94 below its axis of pivotal movement. In the preferred embodiment of the invention, the trigger bar or member 112 carries a holding pawl catch assembly generally indicated at 118, which in the form shown includes a channel member 120 pivotally mounting as at 122 a bail member 124 which rests on pins 126 fixed to the channel shaped member 120 so that the bail member 124 projects in the direction of the holding pawl 94. Bail 124 includes the closed mid portion 128 (see FIGURE 6) that is positioned for engagement with a protuberance or projection 130 formed on the holding pawl 94 above its axis of pivotal movement.

Further in accordance with this invention, the holding pawl 94 is moved entirely out of operative engagement with the rack teeth 92 at a point in the operation of the brake cylinder when the pawl 94 is released from binding engagement with the rack member, and this is achieved by (in addition to providing for the aforementioned lost motion) connecting the holding pawl release device 110 with the brake rigging so that its movement will be correlated with the brake rigging operation to achieve brake rigging slack take up when such is required by the truck brake shoes. This required movement control may be effected by pivotally connecting trigger bar or member 112 to cylinder lever 20 by a trigger lever 140; in the form of FIGURES 1–18, the trigger bar 112 is pivotally connected to trigger lever 140 as at 142 with the trigger lever being fulcrumed at 143 (see FIGURE 1) to the car structure. The connection between lever 140 and lever 20 comprises an adjustment assembly generally indicated at 144 (see FIGURES 1, 2 and 11). The adjustment assembly 144 includes pivotal connections 146 and 148.

The structure described so far makes brake rigging slack take up automatic, in the manner about to be described, but since it is also desirable that brake rigging let out likewise be automatic, my invention contemplates the use of the holding pawl release device 110 to effect this function, by securing to the trigger bar or member 112 cam plates 150 and 152 that are provided with cam surfaces 154 and 156 adapted to cooperate with pins 158 and 160 of the working pawls 96, respectively. The cam plates 150 and 152 and their cam surfaces 154 and 156 as well as the positioning of cam pins 158 and 160 of the respective pawls 96 are positioned and proportioned so that, for instance, as the brake beams 32 and 42 are moved away from the illustrated truck wheels 75 in the manner that is now customary to make room for the usual brake shoe replacement manipulations, the cam plates 150 and 152 will be drawn from the left of FIGURE 3, with respect to housing member 80, into engagement with the respective cam pins 158 and 160 to position such cam pins on the respective cam surfaces 154 and 156, respectively, which moves the respective working pawls 96 out of range, or above the elevation of, the rack teeth 92, whereby, the tension forces applied to the center rod structure by the movement of the brake beams away from the respective truck wheels will draw the housing member 80 to the right of FIGURE 3 with respect to the rack member 84 against the action of compression spring 104. This action is provided and controlled by the linkage 145 provided by the lower lever 140 and the adjustment device 144. Application of brake shoes to the other truck effects a similar relative movement between the components of my slack adjuster.

The slack adjuster 10 as thus for described operates as follows: When the apparatus 10 is applied to a new car with new brake shoes, the relative positions of the holding and working pawls, the housing member 80 and the rack member 84 are substantially as indicated in the full line showing of FIGURES 3 and 12. When the brake cylinder is operated, the thrust or piston rod 18 is moved to the right of FIGURE 1 to produce the brake rigging movements previously described, the result of which is the application of considerable tension forces to the center rod structure. The movements of the cylinder or live lever 20 under the action of the brake cylinder in applying the brakes effects a relative movement of the holding pawl device 110, with respect to the housing member 80, by virtue of the control linkage 145 which is provided by the trigger lever 140 and its connection to the lever 20.

When the brake shoes of the car are new, this moves the lever 140 and the holding pawl release device 110 between the full line positions of FIGURES 3 and 12 and the dashed line positions of the same figures, while at the same time the working pawls 96 will be moved to the right of FIGURES 3 and 12, with respect to the rack member 84 to bring one of the working pawls 96 into engagement with a face 92a of the rack teeth, as indicated in FIGURE 13. This results in the thrust provided by the brake cylinder being transmitted to both of the railroad car truck brake apparatus, and it will be apparent that when the brake cylinder reaches the end of its power stroke, at a point in the operation of the car when the brake shoes are new, the working pawls 96 will have the relative positions indicated in FIGURE 13 with respect to the rack, while the holding pawl release device 110 will have the relative position indicated in dashed lines in FIGURE 12. Additionally, the holding pawl 94 will be released from binding engagement with the rack member 84 because of the lost motion taken up during the brake power stroke; That is, pawl 94 will still remain in engagement with rack teeth 92, but it will be freed of any forces directed against it by the biasing action of spring 104.

The showing of the holding pawl release device 110 in dashed lines of FIGURE 12 indicates the extent of movement of this mechanism from the full line position of FIGURE 3 after a normal seven inch brake cylinder power stroke, and it will be observed that bail member 124 is still separated from the holding pawl protuberance or projection 130 by a considerable spacing.

After the brake cylinder power stroke is completed, and the brakes released, the weight of brake beams 32 and 42 of each truck and their swingable suspension by hanger members 50 causes the brake rigging to move in the direction opposite to the respective arrows 70 and 72, with the result that the holding pawl release device 110 moves from the right of its dashed line showing of FIGURE 12 to approximately the relative position of its full line showing. Also, spring 104 then restores pawls 94 and 96 to their relative positions on FIGURE 12.

As already mentioned, each time the car brakes are applied, the brake shoes wear away a distinct amount, with the result that the brake cylinder power stroke increases in length a corresponding fractional amount each time the brakes are applied, and also, the holding pawl release device at the end of the brake cylinder power stroke has approached the holding pawl a corresponding amount over that position shown in dashed lines in FIGURE 12.

As brake shoe wear proceeds, the portion 128 of bail member 124 progressively comes closer and closer to the holding pawl at the end of each power stroke (before returning to the right of FIGURE 12) until said portion 128 contacts protuberance 130. As further brake applications occur, the bail member 124 will tend to ride further and further up on the protuberance 130.

After brake shoe wear has reached the point where brake rigging slack take up is to be effected to restore the brake cylinder to its original seven inch stroke, the bail member 124 will slip over the top of the protuberance 130 of the holding pawl, during application of the brakes, and when the power stroke is completed (and the weight of the brake beams tend to move the brake rigging in the opposite direction against the opposition of the air trapped in the brake cylinder), the holding pawl release device will be moved from the dashed line position of FIGURE 13 to the full line position of FIGURE 13, pivoting holding pawl 94 about its pivotal axis by what amounts to a kicking action, and thereby moving it out of operative engagement with the rack teeth 92. There is no opposition to this kicking out of the holding pawl 94 since during the power stroke of the brake rigging the holding pawl is released from binding engagement with the rack member, and there is sufficient inertia in the system so that there will be no relative movement between the rack member 84 and the housing 80 before the pawl kick out has occurred. However, the arrangement for actuating pawl 94 must be such that only a slight movement of device 110 to, for instance, the right of FIGURE 12, will effect adequate movement of the toothed portion of pawl 94, and I have determined that, for specific arrangements equivalent to those illustrated, the distance $x$ (see FIGURE 12) between the protuberance 130 and the pivotal axis 244 of pawl 94 is preferably less than the distance $y$ between such axis and the toothed portion of pawl 94 by a ratio that is at least on the order of two to one; also, protuberance 130 preferably should be approximately 180 degrees opposite the toothed portion of pawl 94, as indicated in the drawings.

The functioning of the kick out action on pawl 94 requires that a certain minimum lost motion between the rack member and working pawls 96 be provided in order that the system inertia may be taken advantage of in kicking out pawl 94; this cannot exceed an amount which would cause pawls 96 to move out of proper functioning relation with teeth 92. I have found that such lost motion should be in the range of $1/16$–$1/8$ inch to provide a properly functioning apparatus. However, the relative lengths of distances $x$ and $y$ and location of protuberance 130 with respect to the teeth of pawl 94 will be controlled by appropriate timing considerations.

While the lifting action on the holding pawl 94 is practically instantaneous, and pawl 94 is almost immediately released from the holding pawl release device 110 by virtue of the continued movement of the holding pawl release device to the right of FIGURE 13 under the gravitating action of the brake beams, the compression spring 104 will be effective to withdraw the rack member 84 into housing member 80 the equivalent of half a tooth so that when the holding pawl 94 again drops into engagement with teeth 92, it will have the operative position shown in FIGURE 14. The working pawls 96 merely ratchet over teeth 92 to the new position of FIGURE 14.

It will be observed that in the new position of FIGURE 14, not only is the holding pawl release device 110 restored to its original operating position when the brake shoes were new, but also that the working pawls 96 have changed their relative position so that the left hand working pawl, in the showing of FIGURES 12–14, is positioned for thrust applying engagement with the rack member 84, after the aforementioned lost motion has been taken up during the power stroke of the brake cylinder.

Further consecutive operations of the brake apparatus produce a like progression in the advancement of the working of the holding pawl release device 110 toward the holding pawl 94, and when the brake shoes have worn away another predetermined increment, the movement of the holding pawl release device 110 to the left of FIGURE 14 with respect to the pawls will be sufficient to dispose bail 124 behind pawl protuberance 130 and effects a kicking out of the holding pawl from the rack teeth, which permits another advancement of the rack member within the housing member 80 under the action of spring 104. This will position the pawls and holding pawl release device in substantially the same positions as indicated in FIGURE 12, except that the rack member 84 will be advanced within the housing member 80 a length corresponding to one full tooth.

This operation of the slack adjuster proceeds automatically while the car is in service, with the rack member 84 being advanced within the housing member 80 to take up excess brake rigging slack.

Eventually, and depending on how often the car brake apparatus is used, the slack adjuster pawls, rack member and holding pawl release device will have operative positions approximating those shown in FIGURE 15. At this point in the operation of the slack adjuster, brake shoe wear has proceeded to the point where replacement of the brake shoes is required, and as a practical matter, the railroad car inspection by the employees known as "car knockers" determines from the appearance of brake shoes whether or not brake shoe replacement is required; under ordinary circumstances, brake shoe replacement will be effected well before the slack adjuster parts have assumed the operative condition shown in FIGURE 15.

In any event, it is common practice for the "car knocker" to replace the shoes as part of his duties, and to do this, he customarily pries the brake beams away from, for instance, the wheels 75 shown in FIGURE 1 to provide enough working space to fit the shoes in place on the brake beams. As already mentioned, this applies a thrust on the brake rigging, and in particular on the center rod structure 12 that is independent of the operation of brake cylinder 16, which effects a movement of operating rod 26 that is opposite in direction to the direction of arrow 72, thereby causing a corresponding movement of cylinder or live lever 20 that is opposite to the direction indicated by arrow 70.

The trigger lever 140 through its connection to the trigger bar or member 112 moves the holding pawl release device 110 to the right of FIGURE 15 with respect to the housing member 80 and its pawls 94 and 96 to the extent that the working pawls are cammed up upon cam surfaces 154 and 156, respectively, by the inclined cam surfaces 154a and 156a, respectively, to the positions of FIGURE 16. This permits the housing member 80 to be moved to the right of FIGURES 15 and 16 with respect to the rack member 84 under the tension forces that are applied to the center rod structure 12 by the cylinder lever 20 as the brake beams are further pried away from the respective truck wheels 75, with the holding pawl 94 merely ratcheting over the respective teeth 92 of the rack member as indicated by the double headed arrow of FIGURE 16.

When the brake shoes are applied to the other car truck, slack out is effected in a similar manner, though in this instance rack member 84 will be pulled and moved with respect to the housing member 80 (to the left in the showing of FIGURE 16), with the overall movement of these parts actuating linkage 145 to provide the relative movement of release device 110 that is required to effect the positioning of pawls 96 that is indicated in FIGURE 16.

Thus, when the "car knocker" replaces shoes, in doing this work he automatically lets out the brake rigging slack taken up by the slack adjuster to the extent necessary. Further operation of the brake rigging and slack adjuster then proceeds substantially as described above until brake shoe replacement is again required, at which time the brake rigging slack let out is effected in the same identical manner.

While the foregoing generally described details and method of operation indicate the usual manner of functioning of the slack adjuster of this invention, I have arranged the holding pawl release device 110 so that it provides appropriate corrective action when one or more brake shoes have been lost from the car.

In instances where one or two brake shoes have been lost from the car, the bail member 124, on completion of the brake cylinder power stroke, will be so far advanced over and beyond the holding pawl protuberance 130 that when the holding pawl release device is moved back to the right of FIGURE 17 under the gravitating action of the brake beams, the holding pawl 94 will not be lifted out of engagement with the rack member 84. This is because the loss of the brake shoes will have introduced so much slack into the brake rigging that portion 128 of the bail member will not contact the holding pawl protuberance by the time its movement to the right of FIGURE 17 has stopped. However, the trigger bar spring biased pin 116 will have long since contacted the holding pawl 94 and will have been pressed against its compression spring 160 (see FIGURE 7) to the point that it is exerting considerable compressive stress on the pawl 94. The result is that as soon as the holding pawl 94 is released from binding engagement with the rack member, it will be kicked out of the way of teeth 92 and held there until spring 104 is effective to withdraw rack member 94 into housing member 80 the amount required to compensate for the loss of the brake shoes.

If more than two brake shoes are lost, the parts of this device are proportioned so that the working pawl will be forcefully engaged by the trigger bar itself on application of the brake cylinder power stroke to the rigging so that the pawl 94 will be forcefully kicked out of engagement with the teeth 92 of the rack member 84 even if the lost motion between the pawls 94 and 96 has not been taken up. See FIGURE 18 for this particular operation of the device.

After the operations suggested by FIGURES 17 and 18 have been performed, the slack adjusted functions as already described to compensate for the wear on the remainder of the brake shoes. And when the "car knocker" replaces the missing and worn brake shoes, the slack adjuster is restored to its initial position as already described.

FIGURES 10 and 19–25 illustrate other preferred embodiments of the invention which are functionally equivalent to that described above, but include certain improvements and variations that will be described subsequently.

*Specific Description*

The brake rigging 14 in practice may be of any suitable type, though the slack adjuster 10 is best adapted for a center rod brake rigging application. However, it will be obvious to those skilled in the art that the slack adjuster 10 may be readily adapted for application to other brake rigging arrangements, and by making appropriate adjustments in the mounting and proportioning of the linkage 145, the slack adjuster 10 may be applied at any slack controlling point in such rigging.

In the showing of FIGURE 2, the dead lever 60 and the trigger lever 140 are shown secured to car underframe center sill 161 by appropriate bracket structures 163, while cylinder lever 20 and dead lever 60 are slidably associated with bracket structures 165 that are likewise secured to sills 161. However, this showing is for illustrative purposes only as these levers may be applied to the car in any convenient manner. Sills 161 may conveniently form part of the standard Z–26 center sill structure commonly found in railroad car underframes.

The housing member 80 generally comprises an elongate tubular member provided with reduced end portions 170 and 172 and an enlarged median portion 174. In the illustrated embodiment, the housing member takes the form of an elongate tubular element 176 provided with top wall 178, side walls 180 and bottom wall 182. Intermediate the ends of the tube 176, and at the area of the median portion 174, the top wall 178 is cut away to receive upstanding side plates 184 and 186 as well as upstanding end plates 188 and 190, all of which are secured in place in any suitable manner as by welding where indicated at 202 in the drawings and as and where may be required for good engineering practice. The plates 184, 186, 188 and 190 rest on a bottom plate 192 which serves as a supporting wear plate for the rack member 84, and which is secured in place by appropriate bolts 194.

The pawls 94 and 96 are pivoted to the housing member by suitable pins 196 and 198, respectively, which are held in place by cotter pins 204 (see FIGURE 5), or in any other suitable manner. In addition, a transversely extending guide plate 206 is fixed between the side plates 184 and 186 for guiding contact with cam surfaces 154 and 156 of the holding pawl release device cam plates 150 and 152 (see FIGURE 8). These cam plates 150 and 152 also ride on wear plates 192 (see FIGURE 5). The opening defined by the side plates 184 and 186 and end walls 188 and 190 is closed by an appropriate cover of cap 210 that may be fixed in place by appropriate bolts 212 (see FIGURE 5).

The housing member 80 has fixed thereto at its end portion 170 the abutment structure 108 on which rides the rack member 84. In the illustrated embodiment, abutment structure 108 comprises upper and lower plates 216 and 218 and side plates 220 which may be fixed to the housing member by appropriate bolts 222 (see FIGURE 3). As indicated by FIGURE 3, the upper and lower plates 216 and 218 have substantially the same thickness as wear plate 192 and the side plates 220 of abutment structure 108 have substantially the same thicknesses so that rack member is maintained and guided in parallel relation with the housing member 80. This guiding action is also enhanced by the sliding cooperation of the cam plates 150 and 152 between the side plates 184 and 186 and the rack member 84 (see FIGURE 5).

At the other end 172 of the housing member, the housing member has applied thereto, as by appropriate welding where indicated at 224, upper and lower transversely extending abutment members 226 and 228 which are formed, together with the housing member, as at 230 to receive an appropriate pin 82 that forms pivotal connection 24 of FIGURE 1.

As indicated in FIGURES 3 and 8, the upper wall 178 of the housing member end portion 172 is slotted as at 232 to receive bolt 234 that pivotally connects trigger lever 140 to the holding pawl release device 110. The slot 232 provides the necessary operating space required, and trigger lever 140 is slotted at 233 for the same reason, with bolt 234 passing through both slots (see FIGURE 3).

The holding pawl 94 generally comprises in the illustrated embodiment a dual tooth element 240 formed to define a pair of teeth 242 (see FIGURE 12) which are proportioned to engage the rack teeth 92 in the alternate positions shown in FIGURES 12 and 14 (teeth 242 having half the size and spacing of teeth 92). The member 240 is proportioned somewhat as indicated so that gravity will tend to swing it counterclockwise about its pivotal axis 244 (when slack adjuster 10 is positioned as suggested by the showing of FIGURES 3 and 12–14), and thus includes a relatively heavy portion 246 which, in accordance with this invention, is formed with an abutment surface 248 that is positioned for engagement by the holding pawl release device finger member 116, as well as by the end 114 of the trigger bar 112.

The protuberance 130 of pawl 94 merges smoothly into the remainder of the pawl body and includes upright cam surface 250 for the purpose of camming the pawl 94 out of its operative relation with respect to the teeth 92 of the rack member on retraction of the holding pawl release device 110. Protuberance 130 thus forms a pawl catch element position for catching engagement by bail 124.

The pawls 96 may have the general shape indicated in the drawings and define a mono-tooth structure, which is mounted for pivotal movement about the respective axes 252 and 254. Pawls 96 each comprise a body 256 that is proportioned as at 258 (see FIGURE 12) to be gravity biased counterclockwise about the respective axes 252 and 254 in the direction of rack teeth 92. Each body 256 is formed with a similar tooth 260 which includes a plane surface 262 for cooperating with the surface 92a of each rack tooth 92, when the lost motion between the pawls is taken up by operation of the brake cylinder.

The cam pins 158 and 160 of the respective pawls 96 may be in the form of suitable pin structures fixed in any suitable manner to the respective bodies 256, and these elements serve as cam followers under the action of cam plates 150 and 152. The pins 158 and 160 project from opposite sides of the respective pawls 96 to properly cooperate with respective cam plates 150 and 152. Pawls 96 in effect are walking type pawl elements that alternately serve to transmit the brake cylinder thrusts through the slack adjuster.

The torsion spring 100 of the pawl 94 acts between a pin 270 fixed to the housing side wall 184 and a pin 272 fixed to the pawl, as indicated in FIGURE 3. The torsion springs 102 of the pawls 96 are similarly arranged, they acting between pins 274 fixed to the housing wall and the respective cam pins 158 and 160, as suggested by FIGURE 3.

Rack member 84 in the form illustrated comprises an elongate bar 280 appropriately formed in a suitable manner to define rack teeth 92 and having the quadrilateral flange 106 welded thereto as at 282. Rack bar 280 has fixed to its inner end, as by welding at 284, a stop member 286 that is proportioned to engage the inner end 288 of the wear plate 192 (see FIGURE 3), and this limits the brake rigging slack let out permitted by slack adjuster 10.

The generally quadrilateral transverse cross-sectional configurations of the housing 80 and rack member 84 provide for efficient guiding action of the movement between the rack member and the housing member at a number of separate points along the length of the slack adjuster, for instance, at the abutment structure 108, at the rack flange 106, and between the guide plates 150 and 152 of the holding pawl release device 110 (wherein the inner end of the rack member is guided below by the wear plate 192 and above by the trigger bar 112).

The holding pawl release device 110 has already been described in its most important aspects. The trigger bar is formed with tapped hole 290 to receive the trigger lever bolt 234, and the guide plates 150 and 152 are fixed to the sides 292 of the trigger bar by appropriate bolts 294 on either side thereof. The channel member 120 that mounts bail member 124 may be secured to the bar 112 in any suitable manner, as by welding. In the form shown in FIGURE 6, bail member ends 293 are turned toward each other and applied to openings 295 of channel member 120 to form pivotal mounting 122. The bail member 124 may be spring biased against pins 126 by employing a suitable torsion spring arrangement, or in any other convenient manner.

As best shown in FIGURES 6 and 7, the finger 116 of device 110 is slidably received in chamber or bore 300 which houses the compression spring 160. Dowel pin 302 (see FIGURES 6 and 7) is applied through the finger or pin 116 to removably mount same in place, with the dowel pin operating in slots 304 formed in the sides 292 of the trigger bar 112.

The guide plates 150 and 152 define surfaces 306 and 308, respectively, which are disposed at a level that will permit the pawls 96 to pivot into operative engagement with the rack teeth 92 under the action of gravity and springs 102, as indicated by FIGURES 3 and 13. Cam surfaces 154a and 156a form transition surfaces between surfaces 154 and 306, and 156 and 308, respectively.

Obviously, the housing member slot 232, trigger lever slot 233, and the length of the cam plates 150 and 152 must be proportioned to permit the relative movement of the device 110, with respect to the housing and rack members, that is contemplated by this invention.

The adjustment device 144 of linkage 145 that secures the trigger lever 140 to the cylinder or live lever 20 generally comprises (see FIGURE 11) a bifurcated element 310 defining a clevis including spaced arms 312 which are received over the cylinder lever 20 and are formed to receive the pivotal connecting pin 314 that may be secured in place by a suitable cotter pin 316. The member 310 is threaded as at 318 for cooperation with lock nuts 320 positioned on either side of the clevis forming bifurcated angle member 322 that is received over the threaded end of member 310 and defines spaced arms 324 between which the trigger lever 140 is received. A suitable pin 326 is received through the lever 140 and the arms 324 of the member 322 for the purpose of pivotally securing these elements together at 146 of FIGURE 2.

The adjustability provided by the screw threaded end 318 of member 310 and lock nuts 320 permits the brake rigging 14 to be adjusted to provide a brake cylinder stroke of seven inches after the slack adjuster 10 has been mounted in operating position.

The embodiment 10a of FIGURE 10 is generally similar to that of FIGURES 1–9 and 11 except that the holding pawl 94a is operated by a modified holding pawl release device 110a in which the catching bail 124 has been eliminated. In this embodiment of the invention, the operating parts are so adjusted that the pin 116 exerts sufficient pressure against pawl surface 248, after the lost motion is taken up between the pawls 96 and rack member 84, such that the pawl 94a will then be kicked free of rack member teeth 92, thereby permitting the slack take up contemplated by this invention. Thus, this embodiment of the invention is a two-phase holding pawl release slack adjuster, it being contemplated that the pin 116 would function to actuate the slack adjuster for a normal slack take up purpose, while the end surface 114 of trigger bar 112 would function to kick pawl 94 out of locking engagement with rack teeth 92 when one or more brake shoes have been lost.

In the embodiment of FIGURE 10, transverse bar 330 applied between walls 184 and 186 and in guiding relation with the upper surface of trigger bar or member 112 provides additional guiding action for movements of the device 110a.

Referring to the embodiment 10A of FIGURES 19–25, this slack adjuster is shown applied to center rod structure 12A of brake rigging 14A which is generally similar to that previously described, as indicated by corresponding reference numbers, except that trigger lever 140A is pivotally secured directly to cylinder lever 20, as at 350, and extends into sliding and swinging engagement with slot 351 of bracket structure 352 affixed to the car structure in any suitable manner, as by being formed a part of angle support 354 affixed to sill 161. Slot 351 should be in vertical alignment with the center line of brake cylinder 16.

Slack adjuster 10A is generally similar to device 10, but instead of trigger lever 140A being pivotally connected to trigger bar 112, it merely contacts one side of a pin 356 that is carried by holding pawl release device bar 112 in place of bolt 234. The housing 80A is formed to accommodate a compression spring 360 that acts between spring seat 362 of the housing and spring seat 364 that is fixed between enlarged ends 366 of cam members 150A and 152B to bias pin 356 of holding pawl release device 110A to the right of FIGURE 23 and against trigger lever 140A. Housing 80A also pivotally mounts a locking pawl 370, which is positioned for engagement with a notch 372 formed in, for instance, cam member 152A, torsion spring 374 biasing it into its locking position; locking pawl 370 prevents such movement of the holding pawl release device (for instance, to the right of FIGURE 23) as will cause release of working pawls 96 until the slack adjuster is to be extended during the operation of applying new brake shoes to the car, at which time it is lifted free of notch 372 by an arm 376 of rod 377 slidably mounted on the exterior of housing 80A by lugs 378 and proportioned to be engaged at its end 375 by cylinder lever 20, and extend into housing 80A through slot 379 (compression spring 380 acting between a lug 378 and a washer 382 fixed to rod 377 to bias arm 376 into engagement with lever 20).

In the embodiment of FIGURES 19–25, the bail member 124 and its support are eliminated in favor of an arm 390 hinged by pin 392 between upstanding plates 394 fixed to the respective cam member 150A and 152A. Arm 390 rides on top of holding pawl protuberance 130 and is biased against same by torsion spring 396, stop forming pins 398 (projecting short of the holding pawl 94) limiting the downward movement of arm 390.

Slack adjuster 10A is a three phase arrangement and operates in the same manner as slack adjuster 10 on application of the car brakes except that it is the arm 390 that shifts holding pawl 94 from engagement with rack teeth 92. Thus, arm 390 is proportioned to drop to the left of protuberance 130 (in the showing of FIGURES 23 and 25) when brake rigging slack take up is required, and as the brakes are released, holding pawl release device 110A moves to the right of FIGURE 23 (with respect to housing 80A) under the biasing action of spring 360 which is permitted to take effect due to the gravitating action of the brake beams to effect the aforedescribed change in the positioning of working pawls 96 with respect to rack member 84 under the action of spring 104.

Between releases of pawl 94, the release device 110A moves gradually further and further to the left of housing 80A (in the showing of FIGURE 23) until brake shoe wear has proceeded to the point that the end 400 of arm 390 drops behind protuberance 130, with the locking pawl being cammed into and out of its notch 372. This relative movement of device 110A is caused by the guiding action of trigger release lever 140A during the brake power stroke, which moves lever 140A about the swinging joint provided by bracket structure slot 351 and thrusts it against pin 356 of device 110A (keeping in mind the brake rigging movements already described in connection with FIGURE 1). On brake release, spring 360 returns release device 110A to the right of FIGURE 23 until locking pawl 370 drops into notch 372.

When the brake shoes are replaced, the action of the brake beams being pried away from the truck wheels moves cylinder lever 20 clockwise about pivot 22 (in the showing of FIGURE 19), which causes sufficient relative movement between rod 377 and housing 80A to swing locking pawl 370 upwardly out of notch 372 and permit the release device 110 to operate working pawls 96 and effect slack let out as described in connection with FIGURES 15 and 16, spring 360 acting to bias the cam members 150A and 152A against follower pins 158 and 160, respectively, to cam pawls 96 to the desired raised inoperative positions (cam member enlargements 366 abutting against the nearest pawl shaft 198 at the end of the desired range of this movement).

Thereafter, when the car brakes are next applied, the consequent tensioning of the brake rigging will effect the relative movement between the release device 110A and housing 80A that is necessary to restore the positioning indicated in FIGURE 23, trigger lever 140A pressing device 110A to the left of FIGURE 23, against the action of spring 360, to the point where pawl 370 will ride over notch 372 and thence to the right of same, with respect to device 110A, where it is in proper position for normal slack take up operation.

The component parts of device 10A are arranged so that trigger bar pin 116 and the trigger bar 112 itself will function as aforedescribed when the indicated number of brake shoes are lost. Under such circumstances, the end 400 of holding pawl release arm 390 will be disposed sufficiently to the left of protuberance 130 through part of the brake power stroke so that it may rest against stop pins 398. When the device 110A returns to the right of FIGURE 23 under the biasing action of spring 360, the arm end 400 rides over cam surfaces 402 and 404 of pawl 94, and thence over protuberance 130.

In the embodiment of FIGURES 19–25, the connection of trigger lever 140A to cylinder lever 20 at a point spaced from the connection 27 to rod 26 is considered important since the usual wear associated with connection 27 will then have no adverse affect on the functioning of the release device 110A. The actual location employed will be governed by the leverage compounding ratio of lever 20 and the relative movement required of bar 112.

A specific embodiment of the illustrated forms of the invention is arranged to provide a minimum brake cylinder stroke of seven inches, with the slack adjuster effecting brake rigging slack take up as soon as brake shoe wear has proceeded to the extent that the brake cylinder stroke exceeds seven inches by five-eighths of an inch.

The brake rigging center rod application of this invention is preferred since by applying the slack adjuster to the center rod structure, it is possible to keep the cylinder lever 20 and the dead lever 60 approximately parallel and disposed with respect to the car underframe center sills 161 such that these levers will be positioned with respect to such sills to apply maximum leverage during the power stroke of the brake cylinder.

*Distinguishing Characteristics of Invention*

It will therefore be seen that I have provided a slack adjuster that is not only fully automatic for both slack take up and let out directions, but which is composed of a reliable rack and pawl arrangement that does not require optimum working conditions or close manufacturing tolerances.

The kicking out of holding pawl 94 at a time when it is not in binding engagement with the rack member avoids tooth wear and insures full operation of the slack adjuster when slack take up is required. And spring 104 in effecting slack take up acts only between and on, for instance, the housing member 80 and the rack member 84, which means that it does not have to actuate the truck brake beams to effect slack take up.

The three phase operating considerations of holding pawl release device 110 permits full control over operation of the holding pawl at all times. For instance, as the bail member 124 advances up pawl protuberance 130 it biases the pawl 94 towards its position of operative engagement with the rack teeth, but as soon as bail member 124 drops behind protuberance 130, the pawl 94 is immediately and positively lifted out of engagement with teeth 92, and then released for return to its position of locking engagement with teeth 92 under the action of spring 100.

In the embodiment of FIGURES 19–25, the biasing action of arm 390 in the direction of rack member 84 provides a desirable stabilizing affect, though the kicking action on pawl 94 is the same as described in connection with the embodiment of FIGURES 1–9.

Furthermore, in all the illustrated embodiments, the let out action of the slack adjuster is effected by the usual and customary process of brake shoe replacement without requiring any adjustment of the shock adjuster whatsoever.

The foregoing description and the drawings are given merely to explain and illustrate my invention and the invention is not to be limited thereto, except insofar as the appended claims are so limited, since those skilled in the art who have my disclosure before them will be able to make modifications and variations therein without departing from the scope of the invention.

I claim:

1. An automatic two-way slack adjuster adapted to form a part of railroad car brake rigging as a tension force transmitting device, said adjuster comprising an elongate housing member, a rack member mounted in said housing member for movement with respect thereto in take up and let out directions, resilient means acting on said rack member for biasing said rack member in said take up direction, said rack member being formed with rack teeth and having one end thereof projecting from one end of said housing member in said let out direction, a holding pawl carried by said housing member and mounted in operative relation to said rack teeth of said rack member to engage same for preventing movement of said rack member in said take up direction, a working pawl carried by said housing member and mounted in operative relation to said rack teeth to engage same for preventing relative movement of said pawls toward their said operative relations with respect to said rack teeth, said pawls being positioned and proportioned with respect to each other and to said rack member to provide lost motion between said housing and rack members on application of tension forces to said one end of said rack member and said other end of said housing member in the direction required to free said holding pawl from the binding engagement with said rack teeth caused by said resilient means, and a holding pawl release device mounted for movement longitudinally of said rack member and toward and away from said holding pawl, said release device being carried by said housing member and including pawl actuating means for actuating said holding pawl to move said holding pawl out of its said operative relation with said rack teeth on said freeing of said holding pawl, when the rigging slack exceeds a predetermined maximum, whereby said resilient means is effective to move said rack member in said take up direction, and means operatively connected to said release device for movement therewith for moving said working pawl out of its operative relation with said rack teeth to automatically permit relative movement of said rack and housing members in said let out direction on application of tension forces to said adjuster, said pawl actuating means of said release device comprising a two phase holding pawl actuating contacting device including a composite holding pawl kick out member comprising a resiliently mounted pin member and a rigid projecting member, said pin and projecting members being positioned for consecutively successive camming engagement with said holding pawl.

2. An automatic two-way slack adjuster adapted to form a part of railroad car brake rigging as a tension force transmitting device, said adjuster comprising an elongate housing member, a rack member mounted in said housing member for movement with respect thereto in take up and let out directions, resilient means acting on said rack member for biasing said rack member in said take up direction, said rack member being formed with rack teeth and having one end thereof projecting from one end of said housing member in said let out direction, a holding pawl carried by said housing member and mounted in operative relation to said rack teeth of said rack member to engage same for preventing movement of said rack member in said take up direction, a working pawl carried by said housing member and mounted in operative relation to said rack teeth to engage same for preventing relative movement of said pawls toward their said operative relations with respect to said rack teeth, said pawls being positioned and proportioned with respect to each other and to said rack member to provide lost motion between said housing and rack members on application of tension forces to said one end of said rack member and said other end of said housing member in the direction required to free said holding pawl from the binding engagement with said rack teeth caused by said resilient means, and a holding pawl release device mounted for movement longitudinally of said rack member and toward and away from said holding pawl, said release device being carried by said housing member and including pawl actuating means for actuating said holding pawl to move said holding pawl out of its said operative relation with said rack teeth on said freeing of said holding pawl, when the rigging slack exceeds a predetermined maximum, whereby said resilient means is effective to move said rack member in said take up direction, and means operatively connected to said release device for movement therewith for moving said working pawl out of its operative relation with said rack teeth to automatically permit relative movement of said rack and housing members in said let out direction on application of tension forces to said adjuster, said pawl actuating means of said release device comprising a three phase holding pawl actuating device comprising a carrier member including means for tripping said holding pawl, a resiliently mounted pin member, and a rigid projecting member, said tripping means, said pin member and said projecting member being positioned for consecutively successive camming engagement with said holding pawl.

3. A railroad car brake system arrangement including a brake cylinder and piston device operatively connected to one end of a cylinder lever which is in turn connected by a center rod structure to a dead lever swingably anchored at one end thereof to the car, with the other ends of the cylinder and dead levers being adapted to be operatively connected to railroad car truck brake apparatus, said brake device being oriented with respect to the car to apply tension forces to said center rod structure during its brake actuating power stroke, a brake rigging slack adjuster for maintaining substantially uniform the power stroke length of said brake device comprising a pair of elongate members disposed in juxtaposed parallel relation, means for securing said members together in relatively movable take up and let out directions, one of said members being formed with rack teeth and being connected at one end thereof to said center rod structure, with the other member being connected to the cylinder lever, whereby said slack adjuster forms a part of said center rod structure, resilient means for biasing said one member to move relative to the other member in a take up direction, said resilient means acting between said members, a holding pawl carried by said other member and mounted in operative relation to said rack teeth to engage same for preventing movement of said one member in said take up direction, a working pawl carried by said other member and mounted in operative relation to said rack teeth to engage same for preventing relative movement of said members in said let out direction, said pawls being positioned and proportioned with respect to each other and to said one member to provide lost motion between said members on the application of the power stroke of said brake device on said cylinder lever in the direction required to free said holding pawl from the binding engagement with said rack teeth, caused by said resilient means, and a holding pawl release device mounted for movement longitudinally of said rack member and toward and away from said holding pawl, said release device including holding pawl actuating means for actuating said holding pawl to move said holding pawl out of its said operative relation to said rack, means for controlling the movement of said release device to cause same to actuate said holding pawl on said freeing of said holding pawl when slack in the rigging exceeds a predetermined maximum, whereby said resilient means is effective to move said one member in said take up direction, and means carried by said slack adjuster and operatively associated with said control means for moving said working pawl out of its operative relation with said rack teeth to permit relative movement of said members in said let out direction on application of tension forces to said rigging by means other than said brake device, said release device movement controlling means comprising a sensing linkage operatively connected between said cylinder lever and said holding pawl release device, said sensing linkage comprising an arm swingably anchored to the car adjacent the end thereof, said arm being pivotally connected to said cylinder lever between said other end thereof and the connection between said cylinder lever and said other slack adjuster member, with there being a lost motion pivotal connection between said arm and said release device, and adjusting means interposed between said arm and said cylinder lever for adjusting the power stroke length of said brake device to an initial predetermined minimum length.

4. An automatic two-way slack adjuster adapted to form a part of railroad car brake rigging as a tension force transmitting device, said adjuster comprising an elongate housing member, a rack member mounted in said housing member for movement with respect thereto in take up and let out directions, resilient means acting on said rack member for biasing said rack member in said take up direction, said rack member being formed with rack teeth and having one end thereof projecting from one end of said housing member in said let out direction, said rack member adjacent said one end thereof and said housing member adjacent the other end thereof including means for connecting said adjuster into the rigging in tension force transmitting relation therewith, a unidirectionally acting holding pawl carried by said housing member and mounted in operative relation to said rack teeth of said rack member to engage same for preventing movement of said rack member in said take up direction, said holding pawl being mounted for free ratcheting movement over said rack teeth on relative movement of said members in said let out direction, a pair of unidirectionally acting working pawls carried by said housing member and mounted in operative relation to said rack teeth to engage same for preventing relative movement of said rack member in said let out direction, said working pawls being mounted for free ratcheting movement over said rack teeth on relative movement of said members in said take up direction, said working pawls being positioned and proportioned with respect to said rack member for alternate walking type locking engagement with said rack teeth, means for biasing said pawls toward their said operative relations with respect to said rack teeth, said holding pawl and said working pawls being positioned with respect to each other and being proportioned to provide lost motion between said housing and rack members on application of forces to said slack adjuster tending to move said members in said let out direction relative to each other, whereby said holding pawl is freed from the binding engagement with said rack teeth caused by said resilient means on application of said forces to the slack adjuster, and a holding pawl release device mounted for movement longitudinally of said rack member and toward and away from said holding pawl, said release device including a member mounted for movement toward and away from said holding pawl and a catch member carried thereby and projecting in the direction of said holding pawl, automatically releasable means for temporarily coupling said catch member to said holding pawl when said catch member moves a predetermined amount in the direction of said holding pawl whereby said holding pawl is moved out of its said operative relation to said rack teeth and automatically released when said catch member is moved in the opposite direction, means for controlling the movement of said release device to cause said catch member to be coupled with said holding pawl on said freeing of said holding pawl, and cam means operatively connected to said release device for movement therewith for moving said working pawls out of their said operative relations with said rack teeth when said release device is moved in said opposite direction a predetermined amount.

5. The slack adjuster set forth in claim 4 wherein said release device further comprises a plunger member carrying said catch member, said plunger member extending in parallel relation to said rack member and being positioned to move said holding pawl out of its said operative relation to said rack teeth when said plunger member moves a predetermined amount in the direction of said holding pawl which is greater than said predetermined amount of movement of said catch member, said automatic releasable means of said catch member and said holding pawl including means for rendering same effective only on movement of said catch member in said opposite direction.

6. The slack adjuster set forth in claim 4 including means for resiliently biasing said release device to move in said opposite direction, and unidirectionally acting latch means interposed between said release device and said housing member for releasably latching said release device against movement in excess of a predetermined amount, with respect to said housing, in said opposite direction.

7. The slack adjuster set forth in claim 4 wherein said holding pawl includes a protuberance positioned for engagement by said catch member, and is proportioned to provide a quick acting lever action for moving the rack member engaging portion thereof away from operative relation to said rack teeth on operation of said release device.

References Cited in the file of this patent
UNITED STATES PATENTS 3,001,612     Mersereau _____ Sept. 26, 1961